S. B. McHENRY.
ASTRONOMICAL DEMONSTRATING DEVICE.
APPLICATION FILED NOV. 19, 1913.
1,134,473.
Patented Apr. 6, 1915.
3 SHEETS—SHEET 3.
Fig. 3.
Fig. 4.
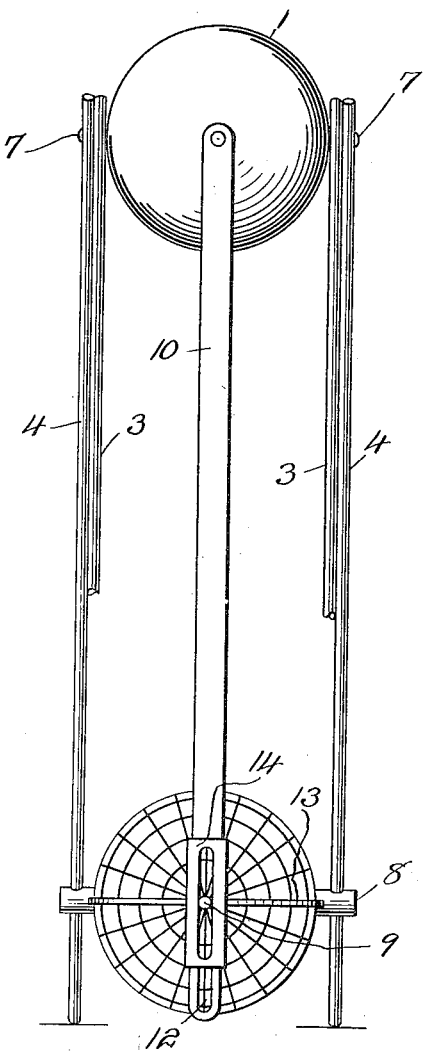
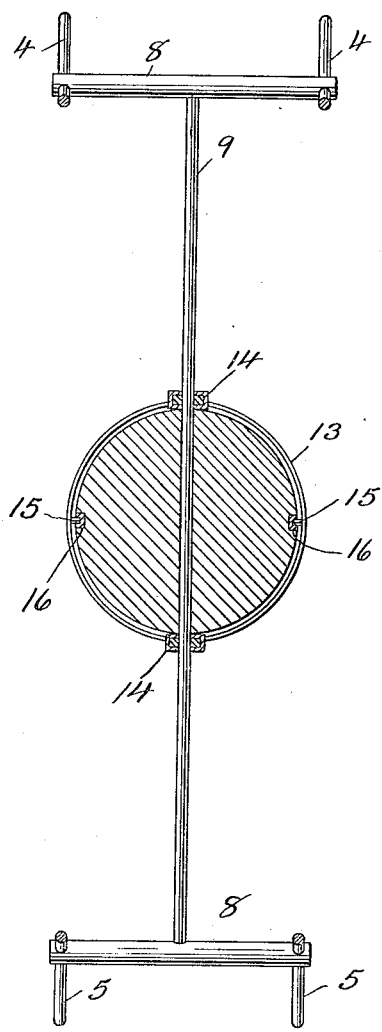
Witnesses
J. F. Britt
C. M. Gould
Inventor
S. B. McHenry
By
Attorneys

UNITED STATES PATENT OFFICE.

SAMUEL B. McHENRY, OF CHICAGO, ILLINOIS.

ASTRONOMICAL DEMONSTRATING DEVICE.

1,134,473.  Specification of Letters Patent.  Patented Apr. 6, 1915.

Application filed November 19, 1913. Serial No. 801,839.

*To all whom it may concern:*

Be it known that I, SAMUEL B. MCHENRY, a citizen of the United States, residing at Chicago, in the county of Cook and State of Illinois, have invented certain new and useful Improvements in Astronomical Demonstrating Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a device for demonstrating the position of the earth with relation to the sun, and has for its object to provide a means for demonstrating in an ocular manner the several positions which the earth occupies in relation to the sun during the several seasons of the year; and the invention has for its further object to provide a device for demonstrating the position of the sun's rays on the earth during the several seasons of the year and while the earth is traveling from one extreme position to the other, and for illustrating the manner in which the earth receives its light from the sun, it being of course understood that only a portion of the orbit is illustrated in this invention.

A further object of the invention is to provide a device for illustrating the manner in which the earth revolves on its axis in relation to the sun.

With this and other objects in view the invention consists in the arrangement of parts representing the sun and the earth, and the invention further consists in certain features of construction and in combinations of parts, all of which will be first fully described and afterward specifically pointed out in the appended claims.

Figure 1:
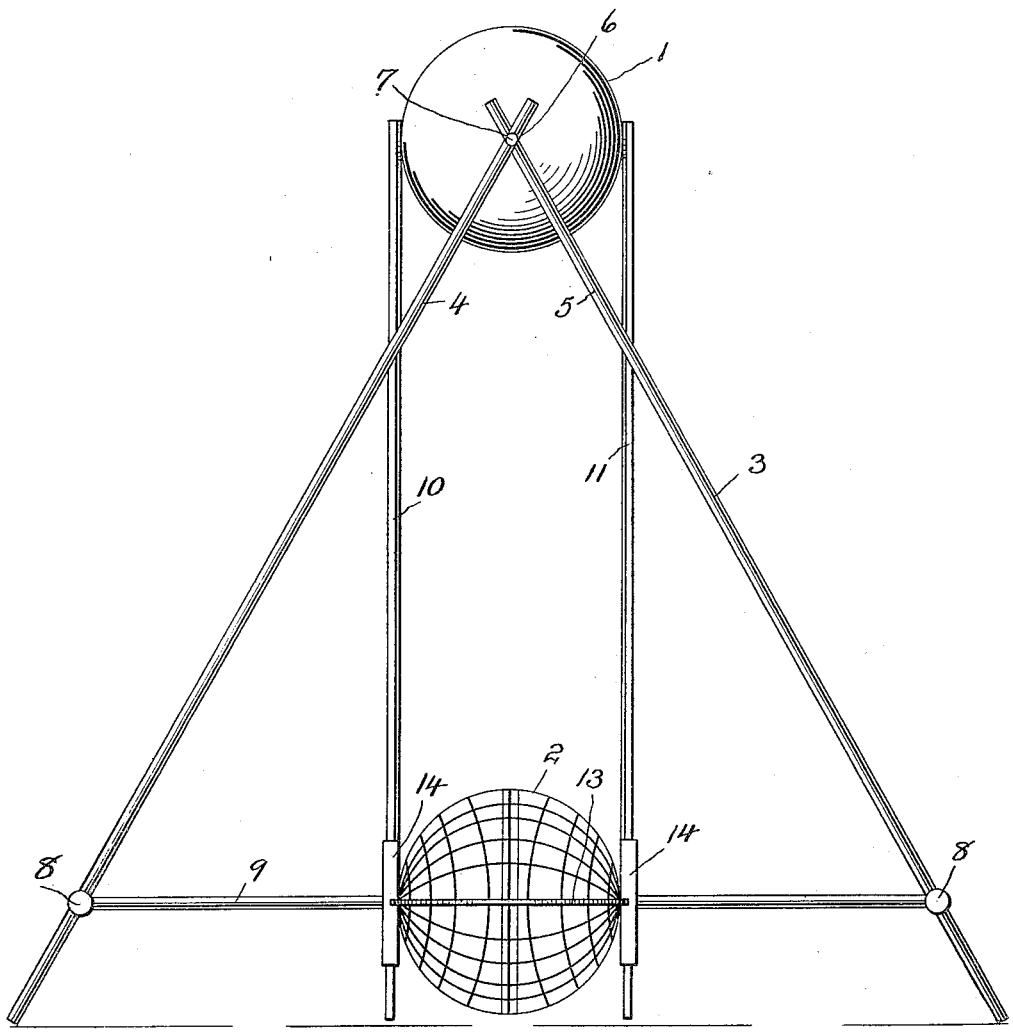
Figure 2:
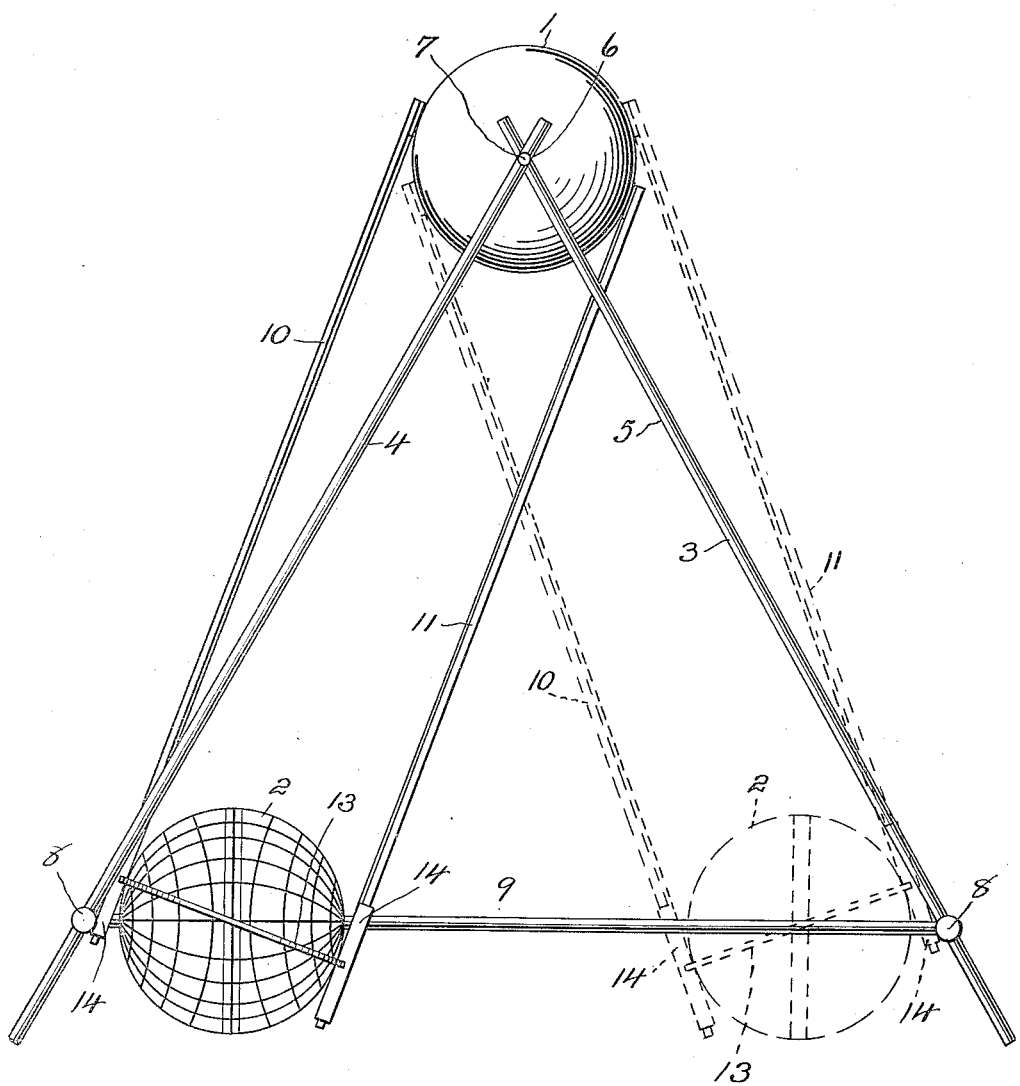

Referring to the accompanying drawing: Figure 1 is an elevation of a device constructed in accordance with my invention. Fig. 2 is a similar view illustrating the earth in its two extreme positions in relation to the sun. Fig. 3 is a side elevation of the device, a portion of the frame being broken away for better illustration, and Fig. 4 is a horizontal sectional view taken through the sphere representing the earth.

Like numerals represent the several parts throughout the several figures.

For the purpose of demonstrating the position of the earth in relation to the sun I have constructed a suitable framework for the purpose of supporting the two spheres representing the sun and the earth in their proper relation to each other.

In the accompanying drawing 1 indicates the sun and 2 indicates the earth. A suitable triangular framework 3 is provided, the side members 4 and 5 crossing each other at 6 from which point a pivotal pin 7 is passed horizontally through the sphere 1 in the manner as will be clearly apparent from an inspection of Figs. 1 and 3. The two frame pieces 4 and 5 on each side of the device diverge from the point 6 and the corresponding pairs of said frame pieces 4 and 5 connected together near their lower ends by a horizontal frame piece 8. Centrally of the two frame pieces 8 and directly under the center of the sphere 1 representing the sun is a horizontal frame piece 9 which is utilized as a slide for the sphere 2 representing the earth to slide on, in the manner as will be hereinafter described.

Attached to the sphere 1 representing the sun, at opposite points on the surface thereof and on an axis at right angles to the pivotal point 7, are two frame pieces 10 and 11, said two frame pieces being provided at their bottom ends with an elongated slide 12 as shown in Fig. 3, through which elongated slides the horizontal frame piece 9 passes.

The sphere 2 representing the earth is marked with the lines of latitude and longitude as shown in the accompanying drawing and the horizontal frame piece 9 passes through the axis of the sphere in the manner as shown in the accompanying drawings. In order to maintain the sphere 2 in proper relation to the sphere 1 representing the sun a band 13 arranged in line with and horizontally of the frame piece 9 encompasses the sphere 2 and is connected at opposite points to suitable slides 14 which slide upon the frame pieces 10 and 11 and through which the horizontal frame piece 9 passes.

Pivotally connected at the points 15 (Fig. 4) to the annular ring 13 is an annular band 16, said annular band 16 being arranged around the equatorial line of the sphere 2 and is preferably countersunk as shown in Fig. 4 so as to cause the sphere 2 to have a smooth and regular surface.

Having thus described the several parts of the construction arranged for demonstrating the position of the spheres 1 and 2 the operation of the device is as follows: When the device is in position shown in Fig. 1 the equatorial line of the sphere 2 is directly underneath the center of the sphere 1 representing the sun. When in this position the equatorial line of the sphere 2 is nearest the sphere 1 and illustrates the manner in which the equatorial line of the earth receives the full direct rays of the sun, thus causing that portion of the earth to receive a greater degree of heat from the sun than points to the north or south of the said equatorial line. By referring to Fig. 1 it will be seen that the frame pieces 10 and 11 readily show the direction of the rays of the sun toward the earth, each of the frame pieces 10 and 11 being tangential with the north and south pole of the sphere 2 and illustrating an exact hemisphere receiving the rays of the sun. When the earth is in position illustrated in Fig. 1 both the north and south pole of the earth receive the glancing rays of the sun as is indicated by the frames 10 and 11. As the sphere 2 is moved in the horizontal frame piece 9 into position illustrated in full lines in Fig. 2 the axis of the sphere 2 remains unaltered. The equatorial line of the sphere 2 is still maintained parallel with a similar line taken through the surface of the sphere 1. It will be seen from reference to Fig. 2, however, that the position of the annular ring 13 has been altered and that the position of the frame pieces 10 and 11 with relation to the poles of the sphere 2 has also been altered. It will also be seen that when in position, shown in full lines in Fig. 2, the equatorial line of the sphere 2 is not the nearest point to the surface of the sphere 1 representing the sun, and it will be seen that the portion of the surface of the sphere which receives the rays from the sun has also been altered in that the innermost pole of the sphere 2 is in line of the direct rays of the sun while the outermost pole is outside or under the surface of the sphere 2 receiving the rays from the sun. Consequently during the time that the sphere 2 is in the position shown in full lines in Fig. 2 the outermost pole and its adjacent surface is in darkness while of course the sphere 2 is rotating on its axis once every 24 hours while the outermost pole on the sphere 2 and its adjacent surface is also in darkness so long as the sphere 2 remains in the position shown in full lines in Fig. 2. When, however, the sphere 2 is moved into the other extreme position which is illustrated by dotted lines in Fig. 2 the outermost pole of the sphere 2 becomes the innermost pole and is in position to receive the direct rays of the sun while the opposite is true of the opposite pole. It will thus be seen that this demonstrates very accurately the position of the sun at the poles of the earth at the different seasons of the year, and it will further be seen that a very correct demonstration is provided for the changes of seasons, in that during the passage of the sphere 2 from one extreme position different points on the surface of the sphere 2 become nearest to the surface of the sphere 1 representing the sun, while it is also very clearly demonstrated by this device that as the sphere 2 approaches either of its extreme positions the entire sphere 2 recedes from the surface of the sun, thus causing the sphere 2 representing the earth to receive intense heat rays from the sphere 1 representing the sun.

Having thus fully described the device what I claim as new and desire to secure by Letters Patent of the United States is:—

1. In a device of the character described a stationary but partially revoluble element arranged to represent the sun, a suitable frame-work to which said element is pivoted, a horizontally arranged frame-piece, an element rotatable on said horizontally arranged frame-piece and slidable thereon to represent the earth, a ring encompassing said element representing the earth and disposed in line with the poles of the element representing the earth when said element is on said horizontal frame-piece and directly under the said element representing the sun, frame-pieces connecting said two elements representing the sun and the earth and arranged tangentially to said two elements, the said ring being mounted on said tangential frame-pieces so that its position is altered with relation to the poles of the element representing the earth when said tangential frame-pieces and said element representing the earth are moved along said horizontal frame-piece bearing the said element representing the earth, substantially as described and for the purposes set forth.

2. A device of the character described comprising a sphere representing the sun, a sphere representing the earth, a suitable frame upon which the sphere representing the sun is mounted, a horizontal frame-piece upon which the sphere representing the earth is revoluble and slidable relative to the sphere representing the sun, a ring encompassing the sphere representing the earth and supported in line with the poles thereof when said sphere representing the earth is directly under the sphere representing the sun, means for connecting the two spheres together, said connecting means being two frame-pieces arranged tangentially to the two spheres and connected to said ring encompassing the sphere representing the earth to alter the position of the said ring with respect to the poles of the sphere representing the earth when said sphere is moved on the said horizontal frame-piece bearing the same.

3. A device of the character described comprising a sphere representing the sun, a sphere representing the earth, a horizontal member upon which said sphere representing the earth is rotatable and slideable relatively to the sphere representing the sun, pieces connecting the two spheres arranged tangentially thereto and means encompassing the sphere representing the earth and connected to said tangentially arranged pieces and moved thereby upon sliding movement of said sphere representing the earth on the said element bearing the same.

In testimony whereof, I affix my signature, in presence of two witnesses.

SAMUEL B. McHENRY.

Witnesses:
J. H. WESTOVER,
IVA G. WOODEN.

Copies of this patent may be obtained for five cents each, by addressing the "Commissioner of Patents, Washington, D. C."